(12) United States Patent
Higashi

(10) Patent No.: US 7,593,062 B2
(45) Date of Patent: Sep. 22, 2009

(54) VIDEO DISPLAY DEVICE AND VIDEO DISPLAY METHOD

(75) Inventor: Norihiro Higashi, Osaka (JP)

(73) Assignee: Funai Electric Co., Ltd., Daito-shi, Osaka (JP)

( * ) Notice: Subject to any disclaimer, the term of this patent is extended or adjusted under 35 U.S.C. 154(b) by 749 days.

(21) Appl. No.: 11/299,141

(22) Filed: Dec. 8, 2005

(65) Prior Publication Data
US 2006/0132653 A1 Jun. 22, 2006

(30) Foreign Application Priority Data
Dec. 16, 2004 (JP) .............................. 2004-364491

(51) Int. Cl.
H04N 7/01 (2006.01)
H04N 11/20 (2006.01)
H04N 9/12 (2006.01)
G09G 5/10 (2006.01)

(52) U.S. Cl. .................... 348/556; 348/173; 348/445; 348/687; 348/790; 348/797; 345/690

(58) Field of Classification Search ................ 348/173, 348/445, 556, 687, 790, 797
See application file for complete search history.

(56) References Cited

U.S. PATENT DOCUMENTS

| | | | | |
|---|---|---|---|---|
| 5,291,295 | A * | 3/1994 | Srivastava | 348/805 |
| 5,956,092 | A * | 9/1999 | Ebihara et al. | 348/445 |
| 6,369,851 | B1 * | 4/2002 | Marflak et al. | 348/173 |
| 6,392,695 | B1 * | 5/2002 | Watamoto et al. | 348/173 |
| 7,061,552 | B1 * | 6/2006 | Patten et al. | 348/806 |
| 7,110,044 | B2 * | 9/2006 | Wang et al. | 348/627 |
| 7,209,180 | B2 * | 4/2007 | Takagi et al. | 348/558 |
| 7,245,316 | B2 * | 7/2007 | Grimes et al. | 348/173 |
| 7,317,430 | B2 * | 1/2008 | McKay | 345/60 |
| 7,400,345 | B2 * | 7/2008 | Cok | 348/173 |
| 7,440,006 | B2 * | 10/2008 | Lin et al. | 348/173 |
| 7,483,081 | B2 * | 1/2009 | Wu | 348/625 |

(Continued)

FOREIGN PATENT DOCUMENTS

JP 08-248934 9/1996

(Continued)

OTHER PUBLICATIONS

Japanese Notice of the reason for refusal, dated Jun. 18, 2008.

*Primary Examiner*—Brian P Yenke
(74) *Attorney, Agent, or Firm*—Yokoi & Co., U.S.A., Inc.; Peter Ganjian

(57) ABSTRACT

When showing a picture without trimming it while a video signal stored in a frame memory 26 has an aspect ratio different from that of a screen of a plasma display panel 29, with respect to video signals E2a and E2b in areas bordering on blank zones E1 and E3 containing no picture appearing in upper and lower or right and left ends of the screen of the plasma display panel 29, a video signal processor 23 reduces a luminance difference by lowering levels of overshoots 30a and 30b and undershoots 30c and 30d accompanying sharpness processing applied to cope with blurring in edge portions caused by bilinear interpolation, thereby suppresses burn-in of the video signals E2a and E2b in said areas bordering on the blank zones on the plasma display panel 29.

3 Claims, 5 Drawing Sheets

U.S. PATENT DOCUMENTS

| | | | |
|---|---|---|---|
| 2002/0181800 A1* | 12/2002 | Hamada et al. | 382/266 |
| 2003/0113032 A1* | 6/2003 | Wang et al. | 382/275 |
| 2003/0189579 A1* | 10/2003 | Pope | 345/660 |
| 2003/0231257 A1* | 12/2003 | Ochiai et al. | 348/470 |
| 2004/0165064 A1* | 8/2004 | Weitbruch et al. | 348/173 |
| 2005/0018046 A1* | 1/2005 | Tsuzuki | 348/173 |
| 2005/0168644 A1* | 8/2005 | Demas et al. | 348/630 |
| 2007/0058042 A1* | 3/2007 | Farber et al. | 348/173 |

FOREIGN PATENT DOCUMENTS

| | | |
|---|---|---|
| JP | 10-222125 | 8/1998 |
| JP | 2001-175212 A | 6/2001 |
| JP | 2003-174601 | 6/2003 |

* cited by examiner

VIDEO DISPLAY DEVICE AND VIDEO DISPLAY METHOD

BACKGROUND OF THE INVENTION

1. Field of the Invention

The present invention relates to a video display device and a video display method capable of suppressing burn-in in areas bordering on high-luminance portions on a screen.

2. Description of the Prior Art

In recent years, the progress in semiconductor processing technologies has facilitated digital signal processing of video signals. Also, in recent time, in place of conventional cathode ray tubes, video display devices with fixed number of pixels such as LCD (Liquid Crystal Display) devices and plasma display devices have matched the Japanese small houses because of their slimness and have been widely spreading.

The video signaling system to be used for those video display devices is required to display signals of various types of formats such as an HDTV (High Definition Television) broadcast system which is a next generation high-definition system, not to mention television standards like NTSC (National Television System Committee) signals.

In these various types of formats, the numbers of pixels to be handled are different. When displaying video signals of various types of formats with different numbers of pixels, an analog display device such as a conventional cathode ray tube etc. can easily cope with them if a deflection rate of the electronic beam is changed according to the number of pixels per one scanning time period.

However, since the number of pixels to be handled is fixed in the previously described display devices, a conventional analog technology as in the case of a cathode ray tube cannot be used. Therefore, in order to display signals of those various types of formats on a display device whose number of pixels to be handled is fixed, it is essential to optionally change the number of pixels by digital signal processing.

In order to change the number of pixels, it is commonly performed to produce interpolation pixels from the inputted pixel data by interpolation. As such interpolation methods, roughly three types of methods as follows are known.

1. Nearest Neighbor Interpolation

This is a method to pick up data nearest to the position of the pixels after the change of the number of pixels from the pixel data of the inputted pixels, and its hardware construction can be achieved by a very simple logic operation. However, the image quality after the change is considerably degraded. When scaling down, fine lines may disappear or small objects may be deformed. When scaling up, jaggies may appear in the peripheral area.

2. Bilinear Interpolation

This method is to pick up data at two points nearest to the position of the pixels after the change of the number of pixels from the pixel data of the inputted pixels and performs interpolation by using data at the two points. The picture quality is less degraded in this method than in the above nearest neighbor interpolation. However when scaling down to less than ½, a phenomenon called a pixel drop out occurs and the image quality is degraded. Further, since a loose low-pass filter is used in this method, the image is blurred as a whole, particularly in the edge portions. Also, the amount of operation required is greater than that of the nearest neighbor interpolation.

3. Cubic Convolution Interpolation

This method uses the value to which linear filtering is applied by utilizing also the value of the more distant pixel as a value of the input pixel. The amount of operation required in this method is far greater.

Of the three interpolation methods, the image quality after the scaling of the image is best in the cubic convolution interpolation, followed by the bilinear interpolation and nearest neighbor interpolation in that order. On the other hand, the least amount of operation is required in the nearest neighbor interpolation, followed by the bilinear interpolation and cubic convolution interpolation in that order. Considering the above, the bilinear interpolation method is adopted in many cases.

In the bilinear interpolation, however, images tend to be blurred. Therefore, for example, a method called sharpness processing is used to improve such blurring. It is an edge enhancement by using a method to find a secondary differential waveform and adequately add this waveform to an original waveform. By performing such sharpness processing, blurring is improved to some extent. However, it also brings about pre-shoots or overshoots.

On the other hand, Hi-Vision (HDTV) broadcasting, which is expected as next-generation TV broadcasting, is upgraded from experimental broadcasting to test broadcasting and its broadcasting hours are extended. Both the vertical and horizontal resolutions of the above Hi-Vision TV are twice as high as those of the current NTSC system television. The aspect ratio (length-to-width ratio) of its screen is a wide aspect of 16:9 and is more horizontally oriented than the aspect ratio 4:3 of the current NTSC system.

Therefore, when showing a picture of a conventional NTSC-system aspect ratio on a display device of a wide aspect ratio, it was necessary to trim upper and lower ends of the picture, or to widen the picture in the right and the left direction, or to provide a black blank zones containing no picture in the right and left ends. However, the first two methods could damage the original picture quality, particularly when viewing a movie, and could give discomfort to a viewer. Therefore, the method to provide blank zones is commonly used.

However, when providing such blank zones, since they are black zones, there often occurs a considerable difference in luminance between themselves and the picture portion. In addition, when the picture is processed by the above bilinear interpolation, sharpness processing is often applied to improve the blurring of the picture. In such a case, as in a graph of horizontal axis/luminance distribution shown in FIG. 3, overshoots 30a and 30b as well as undershoots 30c and 30d tend to take place in video signals. The luminance difference further increases in the picture portions bordering on the above blank zones. Therefore, display devices such as an LCD and a plasma display with the fixed numbers of pixels tend to have burn-in in picture portions bordering on the blank zones on a screen. In particular, the plasma display has such a tendency.

Conventionally, the following technologies are known to prevent burn-in taking place in a display device.

According to Japanese Patent Application Laid-open No. 08-248934 (Patent Document 1), burn-in of a display device is made inconspicuous by blurring the boundary portion between a lighting and a non-lighting while moving a display screen by the amount equivalent to a required number of pixels after the lapse of a required time.

According to Japanese Patent Application Laid-open No. 10-222125 (Patent Document 2), when showing a picture whose aspect ratio is 4:3 on a screen of a PDP display with a wide aspect ratio, a television video signal is displayed on the display part of the display screen and the outer portions (blank zones) in both ends of the display part are made to emit light with the averaged brightness of the display part.

According to Japanese Patent Application Laid-open No. 2003-174601 (Patent Document 3), when showing a picture with an aspect ratio different from that of a video display screen, the video display position of the display section is moved, which makes the slope of burn-in at the boundary between the video display parts and the mask parts gentle.

The method to move the video display position as in the patent documents 1 and 3 may give discomfort to a viewer. On the other hand, the method to raise the brightness of the blank zones as in the patent document 2 makes it difficult to visually distinguish the blank zones from the picture portion, which is not comfortable for a viewer.

Further, the burn-in is not limited to the one taking place in the areas bordering on the blank zones. It also takes place in other picture portions when a high-luminance state lasts at the same position for a long time. In such picture portions, it is hard to adopt previously described methods of patent documents 1 to 3 from the aspect of picture quality.

SUMMARY OF THE INVENTION

The present invention is made in view of the above. It is an object of the present invention to provide a video display device and a video display method which can easily suppress burn-in of the video signals taking place when showing pictures of different aspect ratios in the high-luminance border areas including the portion bordering on the blank zones without giving discomfort to a viewer or degrading the picture quality.

In order to solve the above problems, according to one aspect of the present invention, there is provided a video display device comprising: a video signal processor converting inputted video signals into digital signals, applying predetermined video signal processing, and producing video signals to be displayed on a plasma display panel; a frame memory in which the video signals produced by said video signal processor are stored; and a plasma display panel module inputting the video signals stored in the frame memory and displaying them on the plasma display panel through a driver driving each pixel. When showing a picture without trimming it while an aspect ratio of the video signals stored in the frame memory is different from that of the display screen of the plasma display panel, with respect to video signals in areas bordering on blank zones containing no picture in upper and lower or right and left ends on the screen of the plasma display panel, the video signal processor reduces the luminance difference by lowering the levels of overshoots and undershoots accompanying sharpness processing applied to cope with blurring at the edge portions caused by bilinear interpolation, thereby suppresses taking place in the areas bordering on the blank zones on the plasma display panel.

With the above construction, the levels of overshoots and undershoots of the video signals in the areas bordering on the blank zones on the plasma display panel are lowered and the luminance difference is reduced. Thus, the burn-in is easily suppressed without giving discomfort to a viewer or degrading the picture quality.

According to another aspect of the present invention, in the video display device converting the inputted video signals into digital signals, applying predetermined video signal processing, and displaying an image through a frame memory in which the video signals are stored, with respect to video signals in areas bordering on high-luminance portions on a screen, the luminance difference is reduced by lowering levels of overshoots and undershoots accompanying sharpness processing applied to cope with blurring in the edge portions caused by bilinear interpolation so that burn-in in the areas bordering on the high-luminance portions on the display screen is suppressed.

With the above construction, the levels of overshoots and undershoots of the video signals in the areas bordering on the high-luminance portions of the display device are lowered and the luminance difference is reduced so that burn-in can easily be suppressed without giving discomfort to a viewer or degrading the picture quality.

According to another aspect of the invention, the display device comprises: a luminance level detector detecting a luminance level at each pixel position on the screen; a luminance level storing unit storing luminance levels detected at predetermined intervals by the luminance level detector; and a luminance level comparing unit comparing luminance levels before and after a predetermined time period stored in the luminance level storing unit. The video signal processor applying predetermined video signal processing and producing video signals to be displayed on the screen regards a portion on the screen as the high-luminance portion when the difference in the luminance level at pixel positions on the screen before and after a predetermine time is within a predetermined value and the luminance level after a predetermined time period is more than a predetermined value according to the luminance level comparing unit. With respect to video signals in the areas bordering on the high-luminance portions, the video signal processor lowers levels of overshoots and undershoots accompanying sharpness processing applied to cope with blurring at the edge portions caused by bilinear interpolation to reduce the luminance difference, thereby suppresses burn-in in the areas bordering on the high-luminance portions on the screen.

With the above construction, the levels of overshoots and undershoots of video signals in the areas bordering on the high-luminance portions of a display device for a predetermined time period are lowered and the luminance difference is reduced so that burn-in can easily be suppressed without giving discomfort to a viewer or degrading the picture quality.

According to another aspect of the present invention, the display device has a video signal processor which applies predetermined video signal processing and produces video signals to be displayed on the screen. If the aspect ratio of the video signals stored in the frame memory is different from that of the screen and a picture is to be shown without being trimmed, the video signal processor regards the video signals in areas bordering on the blank zones as the high-luminance portions when the blank zones containing no picture appear in the upper and lower, or right and left ends of the screen. Further, with respect to video signals in the areas bordering on the blank zones, the video signal processor reduces the luminance difference by lowering levels of overshoots and undershoots accompanying sharpness processing applied to cope with blurring of the edge portions caused by bilinear interpolation, thereby suppresses burn-in in the bordering areas on the screen.

With the above construction, the levels of overshoots and undershoots of video signals in the areas bordering on blank zones of the display device is lowered and the luminance difference is reduced so that burn-in can easily be suppressed without giving discomfort to a viewer or degrading the picture quality.

According to yet another aspect of the present invention, the display device is a plasma display or a liquid crystal display whose numbers of pixels are fixed.

With the above construction, the same effect can be obtained by the plasma display or liquid crystal display.

The construction of the above display device can naturally be applied not only as a device but also as a method. According to the invention in claim 10, in a method to display pictures by converting inputted video signals into digital signals, inputting video signals to which predetermined video signal processing is applied by an image signal processor and stored in a frame memory, and displaying them on a plasma display panel through a driver driving each pixel, when an aspect ratio of the video signals stored in the frame memory is different from that of a screen of the plasma display panel and a picture is shown without being trimmed or scaled up/down, with respect to video signals in areas bordering on blank zones containing no picture in the upper and lower or right and left ends of the screen of the plasma display panel, the video signal processor reduces a luminance difference by lowering levels of overshoots and undershoots accompanying sharpness processing applied to cope with blurring of edge portions caused by bilinear interpolation and further suppresses burn-in in the areas bordering on the blank zones on the plasma display panel.

With the above construction, an image display method capable of obtaining the same effect can be provided.

DESCRIPTION OF THE PREFERRED EMBODIMENTS

Now, each embodiment of the present invention will be described.

Figure 1:
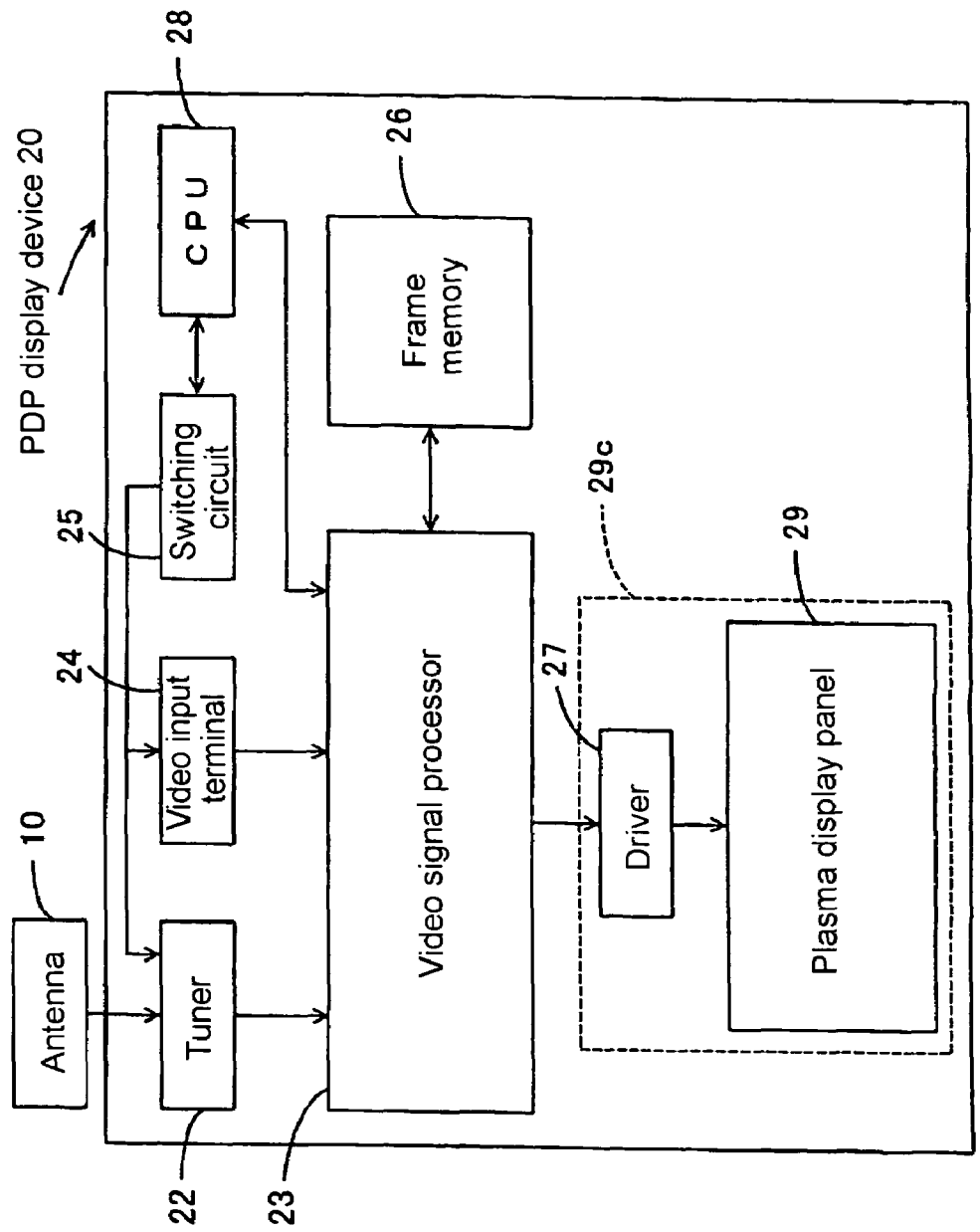
FIG. 1 is a block diagram to explain the first embodiment of the present invention.

FIG. 1 is a block diagram of a display device according to the present invention showing a construction as a TV wherein a plasma display having a wide aspect ratio is used. In FIG. 1, a PDP display device 20 has a tuner 22 inputting frequency signals from an antenna 10. The tuner 22 is, for example, a synthesizer tuner. As a channel-tuning control signal, PLL data, namely, data of frequency dividing ratio of the variable frequency divider in the PLL group, is given to the tuner 22.

The PDP display device 20 has a video input terminal 24. The video input terminal 24 is used for connection to an external device such as a DVD device (not shown). Through the video input terminal 24, external video and audio signals can be inputted. The tuner 22 and the video input terminal 24 are connected to a switching circuit 25. The switching circuit 25 accepts either a video signal from the tuner 22 or a video signal from the video input terminal 24 and supplied it to a video signal processor 23 to be described later. Namely, the PDP display device 20 of the present invention is so constructed as to display both the received image of a TV broadcast and image from the external device such as a DVD device.

The output from the tuner 22 or the video input terminal 24 is supplied to the video signal processor 23 controlled by the CPU 28. The video signal processor 23 performs predetermined signal processing such as converting the inputted video signals into digital signals, separating video signals from audio signals, and converting interlace-type video signals into progressive-type video signals.

A frame memory 26 temporarily stores video signal data of each display screen (frame) to which the above signal processing is applied. The video signal data is outputted to and shown on a plasma display panel 29 through a driver 27 to be described later.

Also, the video signal processor 23 judges an aspect ratio of a picture based on frame data. Further, the video signal processor 23 performs bilinear interpolation according to the number of pixels and sharpness processing to suppress blurring of the picture, produces appropriate subframe data, and outputs it to the driver 27.

Figure 2:
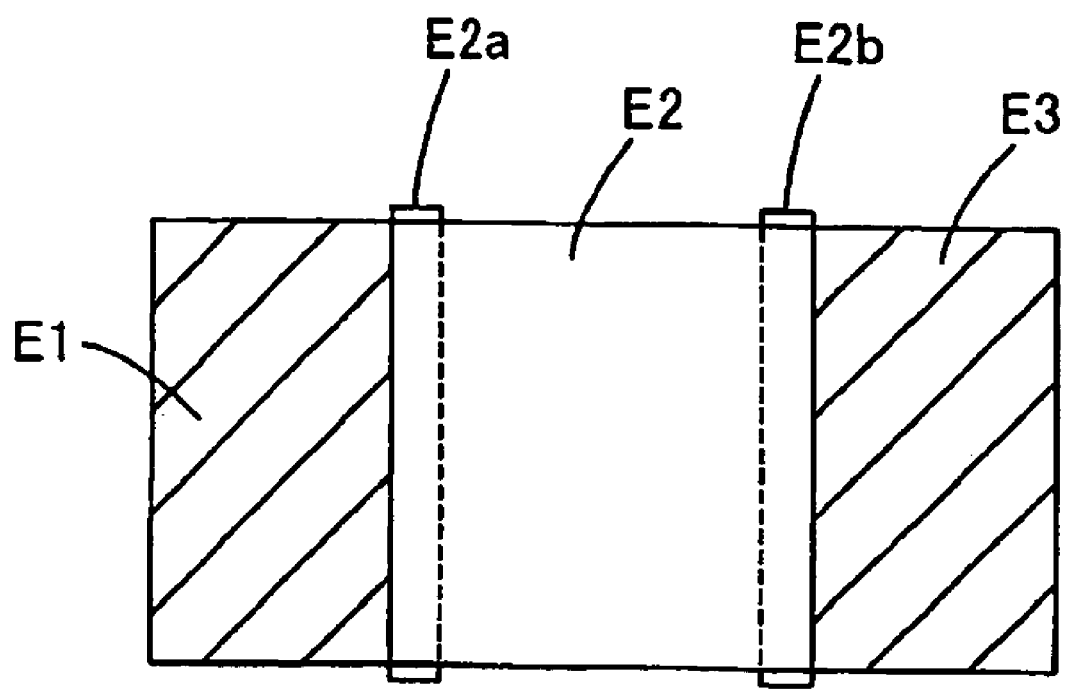
FIG. 2 is a schematic diagram to explain the first embodiment of the present invention.

In this regard, when the aspect ratio of the picture judged by the video signal processor 23 is 4:3, as shown in FIG. 2, subframe data matching a wide aspect ratio of 16:9 is produced by forming black blank zones E1 and E3 containing no picture at the right and left ends of the screen. On the other hand, when the aspect ratio of the judged picture is 16:9, subframe data is produced so as to provide a full screen with no blank zones.

Figure 3:
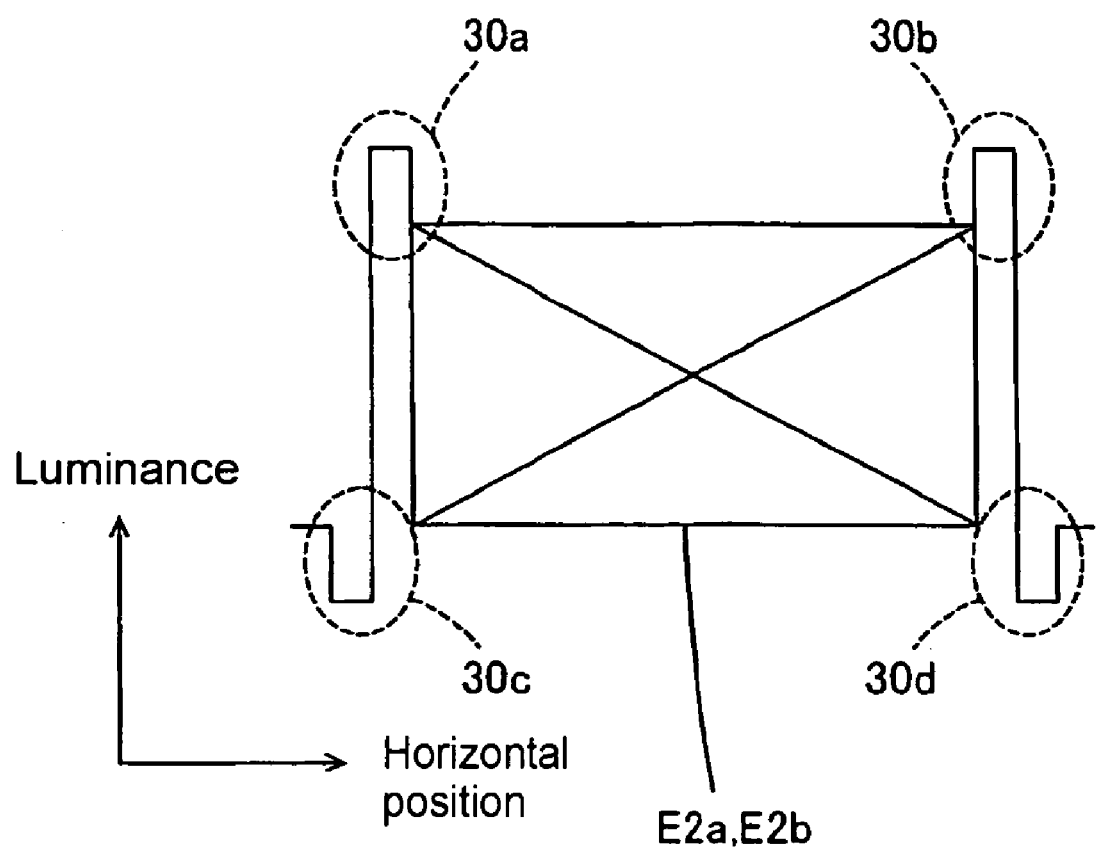
FIG. 3 is a schematic diagram to explain the first embodiment of the present invention.

Further, when the aspect ratio of the judged picture is 4:3, the video signal processor 23 adjusts the sharpness processing on image data E2a and E2b in areas bordering on the blank zones E1 and E3 so that levels of the overshoots 30a and 30b and undershoots 30c and 30d in the horizontal axis/luminance distribution graph of FIG. 3 are lowered. Accordingly, the luminance difference between the image data E2a and E2b in the areas bordering on the blank zones E1 and E3 is lowered and burn-in those areas on the screen is suppressed.

Figure 4:
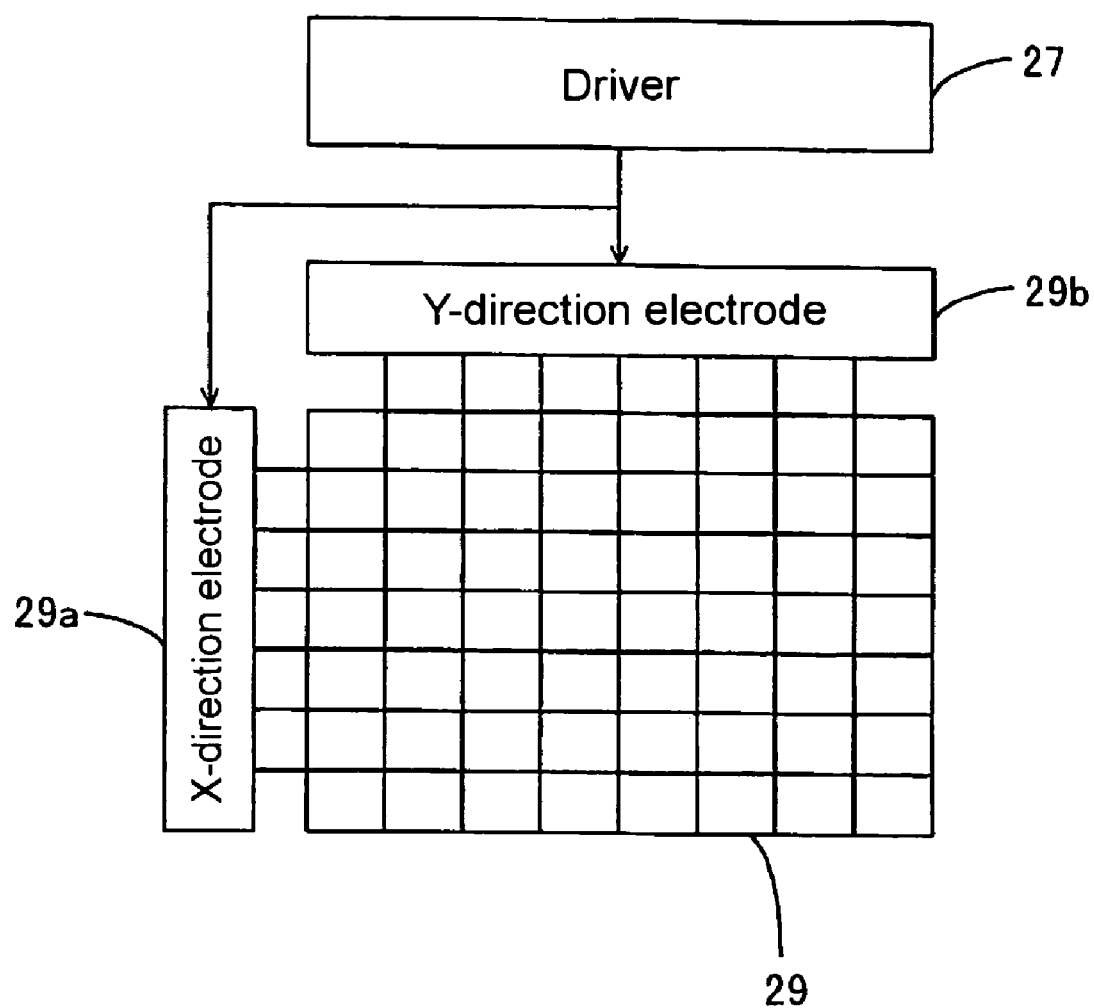
FIG. 4 is a block diagram to explain the first embodiment of the present invention.

As shown in FIG. 4, X-direction electrodes 29a and Y-direction electrodes 29b are provided in a form of a matrix on the plasma display panel 29. It is a display device with (852 pixels/line)×480 pixels, for example, and emits light in a binary manner by turning ON and OFF. The tones are expressed by the sum of light emission of the predetermined number (for example, 10) of subfields having the predetermined number of light emission as a luminance weight and the halftones are displayed.

The driver 27 applies data pulses produced according to frame data stored in the frame memory 26 to both the electrodes 29a and 29b provided in a form of a matrix on the plasma display panel 29, and controls light emission of predetermined cells.

Also, the driver 27 and the plasma display panel 29 constitute the plasma display panel module 29c.

Figure 5:
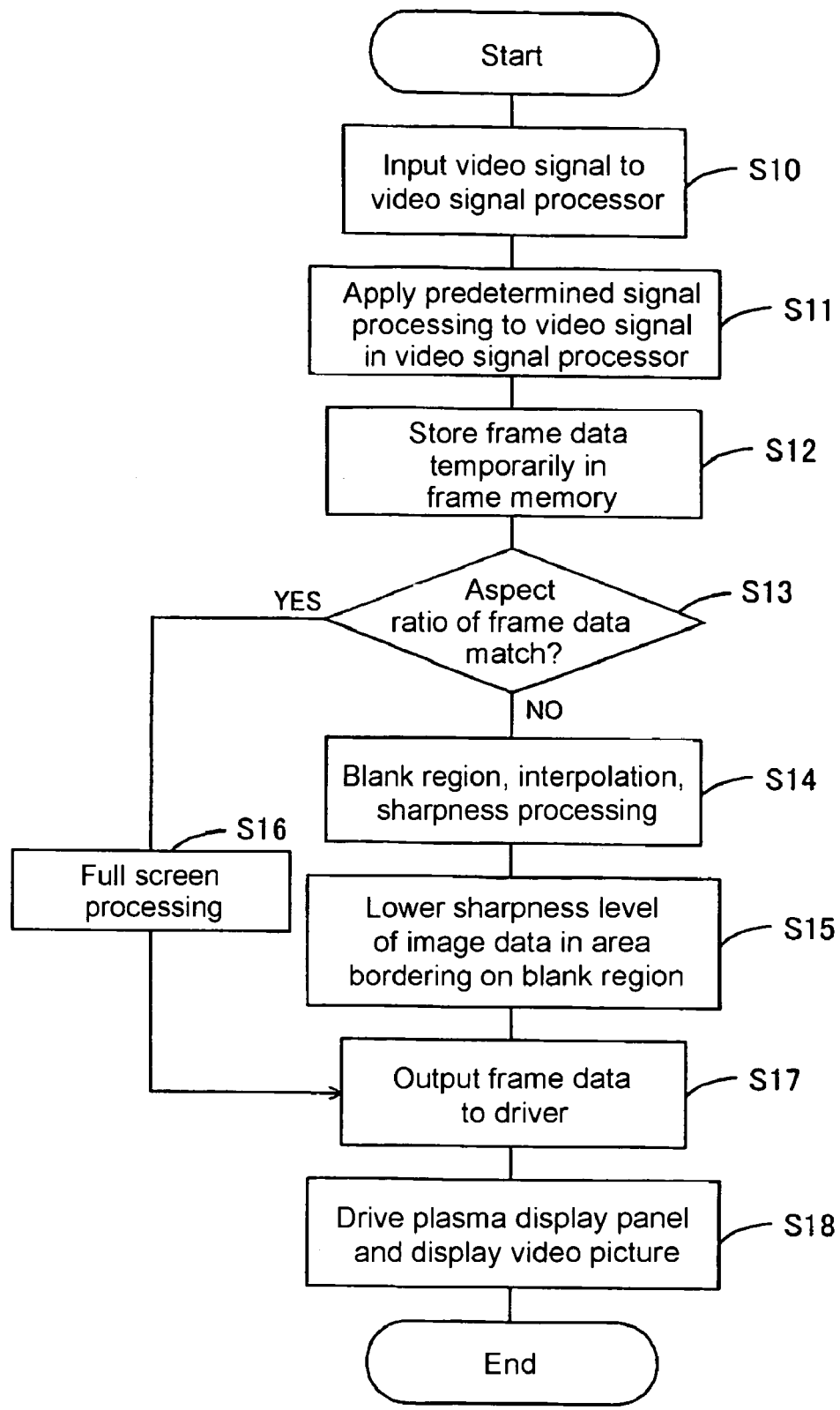
FIG. 5 is a flowchart to explain the first embodiment of the present invention.

Now, referring to a flowchart of FIG. 5, how the PDP display device 20 constructed as above is actually controlled will be described.

First, the PDP display device 20 inputs a broadcast received through the antenna 10 and tuner 22 or video signals inputted from the video input terminal 24 to the video signal processor 23 (S10). The video signal is given predetermined signal processing (S11) such as converting into a digital signal, separating the video signal from an audio signal, converting the interlace-type video signal into a progressive-type video signal in the video signal processor 23, and frame data is temporarily stored in the frame memory 26 (S12).

The video signal processor 23 judges according to the frame data whether or not the aspect ratio of the inputted video signal is a wide aspect ratio of 16:9 (S13). When the aspect ratio of a judged picture is 4:3, in accordance with the number of pixels, bilinear interpolation and sharpness processing to suppress blurring of the picture are performed, and subframe data matching the wide aspect ratio of 16:9 is produced by forming black blank zones E1 and E3 containing no picture at the right and left ends of the screen (S14). On the other hand, when the aspect ratio of the judged picture is 16:9, subframe data is produced so as to provide a full screen (S16).

When the aspect ratio of the judged image is 4:3, the video signal processor 23 adjusts the sharpness processing on the image data E2a and E2b in the areas bordering on the blank zones E1 and E3 so that levels of the overshoots 30a and 30b and undershoots 30c and 30d are lowered (S15). As a result, the luminance difference between the pixels of those areas is lowered so that burn-in can be suppressed. The processing to lower the sharpness level is so minimal that a viewer can hardly recognize it. Besides, since it is the processing not in the picture region E2 but in the pixels E2a and E2b in the areas bordering on the blank zones E1 and E3, the processing does not give discomfort to a viewer or degrades the picture quality.

The produced subframe data are sequentially stored in and read from the frame memory 26, and outputted to the driver 27 (S17). The driver 27 produces data pulses based on the subframe data, which are applied as required to electrodes 29a in the x direction and electrodes 29b in the y direction of the plasma display panel 29 and a picture is displayed (S18).

As described above, with respect to video signals E2a and E2b in the areas bordering on the blank zones E1 and E3 appearing when showing an picture of a different aspect ratio, the PDP display device 20 according to the present embodiment reduces the luminance difference between the pixels in those areas by lowering levels of overshoots 30a and 30b and undershoots 30c and 30d accompanying sharpness processing applied to cope with blurring of the picture caused by bilinear interpolation. Therefore, burn-in can easily be suppressed without giving discomfort to a viewer or degrading the picture quality.

Further, the present invention is not limited to the constitution of the present embodiment, and it can be modified appropriately as follows.

1. In the present embodiment, the case has been described as to the blank zones in the right and left ends of a screen appearing when displaying video signals having an aspect ratio of 4:3 on the screen whose a wide aspect ratio of 16:9. On the contrary, the present embodiment can be applied to blank zones at the upper and lower ends appearing when displaying video signals having an aspect ratio of 16:9 on a screen whose aspect ratio is 4:3.

2. Aspect ratios are not limited to 16:9 and 4:3, and the present invention can be applied to the cases of other different aspect ratios. For example, it can be applied to a vista-size screen with an aspect ratio of 1.66:1 and a cinema scope-size screen with an aspect ratio of 2.35:1.

3. The signal of NTSC system has been described as a signal to be inputted to the display device. However, if the processing is performed with the same idea, any other method such as a PAL system or a SECAM system works similarly and the same effect can be obtained.

4. The burn-in to be suppressed in the present embodiment has been concerning the video signals in the areas bordering on the blank zones. However, the suppression of the burn-in is not limited to the above, and it may be applied to video signals in the areas bordering on the high-luminance portions in the picture region.

In other words, burn-in may take place not only with respect to video signals in the areas bordering on the blank zones but also with respect to video signals in the areas bordering on the high-luminance portions in the picture region. With respect to the video signals in such areas also, burn-in can be suppressed by lowering levels of overshoots and undershoots caused by sharpness processing.

As described earlier, the processing to lower the sharpness level is so minimal that a viewer can hardly recognize it. Therefore, even if the video signals to be processed are in the picture region, the processing does not give discomfort to the viewer or degrade the picture quality.

5. Further, when applying the processing to the video signals in the areas bordering on the high-luminance portions in the above picture region, the application of the processing may be limited to the video signals whose luminance level at more than a predetermined value is maintained for a predetermined time period or longer. Namely, even if the luminance level itself is high, the possibility of occurrence of burn-in is low when such a luminance level doesn't last. Therefore, such video signals are omitted.

As a configuration of such processing, for example, there are provided a luminance level detector detecting a luminance level at each pixel position on a screen; a luminance level storing unit storing luminance levels detected at predetermined intervals by the luminance level detector; and a luminance level comparing unit comparing luminance levels before and after a predetermined time period stored in the luminance level storing unit. A video signal processor regards a portion on the screen as the high-luminance portion when a difference in the luminance level at pixel positions on the screen before and after the predetermined time is within a predetermined value and the luminance level after the predetermine time period is more than a predetermined value according to the luminance level comparing unit. With respect to only the video signals in the areas bordering on the high-luminance portions, the levels of overshoots and undershoots accompanying sharpness processing applied to cope with blurring at the edge portions caused by bilinear interpolation are lowered.

6. The control method of the plasma display described in the present embodiment is only an example. The construction of lowering the levels of overshoots and undershoots caused by the sharpness processing can similarly be applied to various other control methods.

7. The video display device of the present invention is preferably applied to a plasma display. However, it is not limited to the plasma display device and it may be applied to other video display devices with the numbers of pixels fixed such as an LCD, an organic EL (Electro Luminescence) device, etc.

8. It is needless to say that the video display device described above can be provided not only as a construction but also as a method.

What is claimed is:

1. A video display device comprising:
   a video signal processor converting inputted video signals into digital signals, applying predetermined video signal processing, and producing video signals to be displayed on a plasma display panel;
   a frame memory in which video signals produced by said video signal processor are stored;
   a plasma display panel module inputting video signals stored in said frame memory and displaying them on the plasma display panel through a driver driving each pixel,
   a luminance level detector detecting a luminance level in each pixel position on the screen;
   a luminance level storing unit storing luminance levels at predetermined intervals detected by the luminance level detector;
   a luminance level comparing unit comparing the luminance levels before and after the predetermined time period stored in said luminance level storing unit, a video image processor applying predetermined video signal processing and producing video signals to be displayed on the screen regards a portion as a high-luminance portion when a difference in the luminance level at pixel positions on the screen before and after a predetermined time period is less than a predetermined value and the luminance level after the predetermined time period is more than a predetermined value according to said luminance level comparing unit when showing a picture without trimming while an aspect ratio of the video signals stored in said frame memory is different from that of screen of the plasma display panel, with respect to video signals in the areas bordering on blank zones containing no picture appearing in the upper and lower ends or right and left ends of the screen of the plasma display panel, said video signal processor reduces the luminance difference by lowering levels of overshoots and undershoots accompanying sharpness processing to cope with blurring of the edge portions caused by bilinear interpolation, thereby suppresses burn-in in the areas bordering on said blank zones on the plasma display panel.

2. A video display device, comprising:

a video signal processor that converts inputted video signals into digital signals, applying predetermined video signal processing, with the video display displaying a picture through a frame memory in which the video signals are stored, the video display device comprises:

a luminance level detector detecting a luminance level in each pixel position on the screen;

a luminance level storing unit storing luminance levels at predetermined intervals detected by the luminance level detector; and a luminance level comparing unit comparing the luminance levels before and after the predetermined time period stored in said luminance level storing unit, a video image processor applying predetermined video signal processing and producing video signals to be displayed on the screen regards a portion as a high-luminance portion when a difference in the luminance level at pixel positions on the screen before and after a predetermined time period is less than a predetermined value and the luminance level after the predetermined time period is more than a predetermined value according to said luminance level comparing unit and, with respect to video signals in areas bordering on high-luminance portions on a screen, the video display device reduces the luminance difference by lowering levels of overshoots and undershoots accompanying sharpness processing applied to cope with blurring of edge portions caused by bilinear interpolation, thereby suppresses burn-in in the areas bordering on said high-luminance portions on the screen.

3. A video display method comprising the steps of:

converting inputted video signal to digital signals;

applying predetermined video signal processing by a video signal processor;

inputting video signals stored in a frame memory; and displaying the video signals on a plasma display panel through a driver driving each pixel on a screen, detecting luminance level in each pixel position on the screen;

storing the detected luminance level at predetermined intervals;

comparing the luminance levels before and after a predetermined time period;

applying predetermined video signal processing and producing video signals displayed on the screen related to a portion as a high luminance portion when a difference in the luminance level at pixel position on the screen before and after a predetermined time period is less than a predetermined value and the luminance level after the predetermined time period is more than a predetermined value according to the luminance level comparison;

when showing a picture without trimming or scaling up/down while a video signal stored in the frame memory has an aspect ratio different from that of a screen of the plasma display panel, with respect to video signals in areas bordering on blank zones containing no picture appearing in upper and lower or right and left ends of the screen of the plasma display panel, the video signal processor reduces a luminance difference by lowering levels of overshoots and undershoots accompanying sharpness processing applied to cope with blurring in the edge portions caused by bilinear interpolation, thereby suppresses burn-in in the areas bordering on the blank zones on the plasma display panel.

* * * * *